April 17, 1962     E. FETZ     3,029,635
HIGH-TEMPERATURE TESTING APPARATUS
Filed July 9, 1956     3 Sheets-Sheet 1

INVENTOR.
ERICH FETZ
BY *Mitchell & Bechert*
ATTORNEYS

FIG. 8.
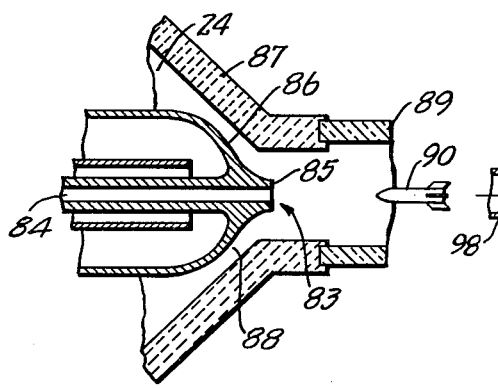
FIG. 11.
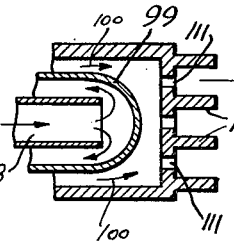
FIG. 11a.
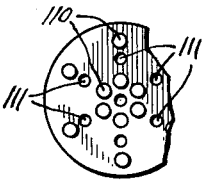
FIG. 9.  FIG. 9a.  FIG. 10.  FIG. 10a.
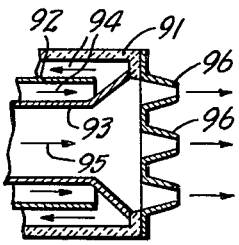 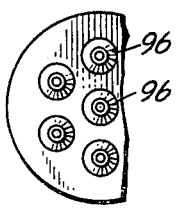 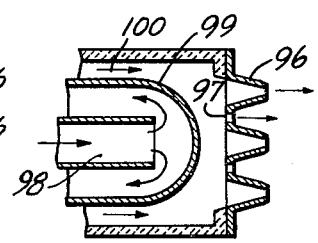 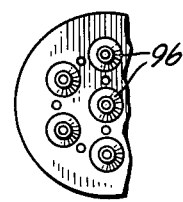
FIG. 4.
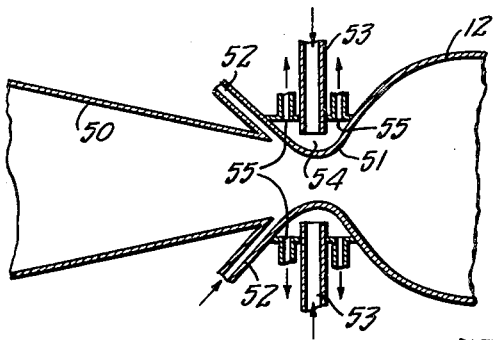
INVENTOR.
ERICH FETZ
BY Mitchell & Bechert
ATTORNEYS

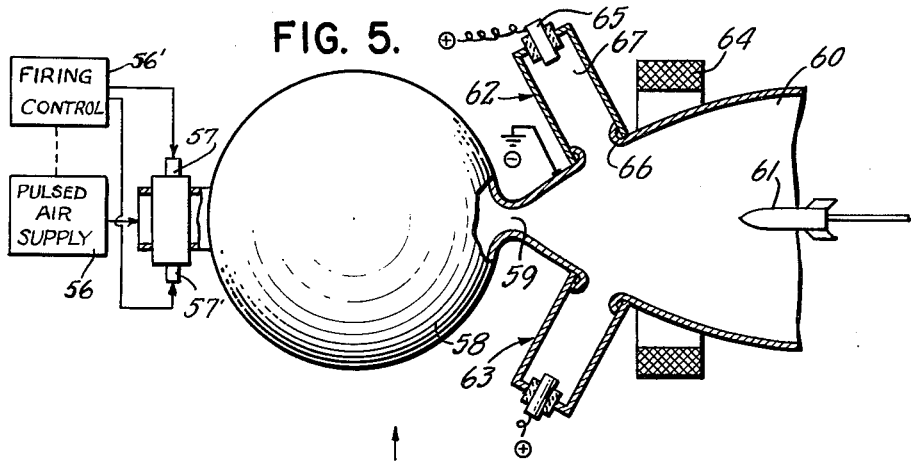
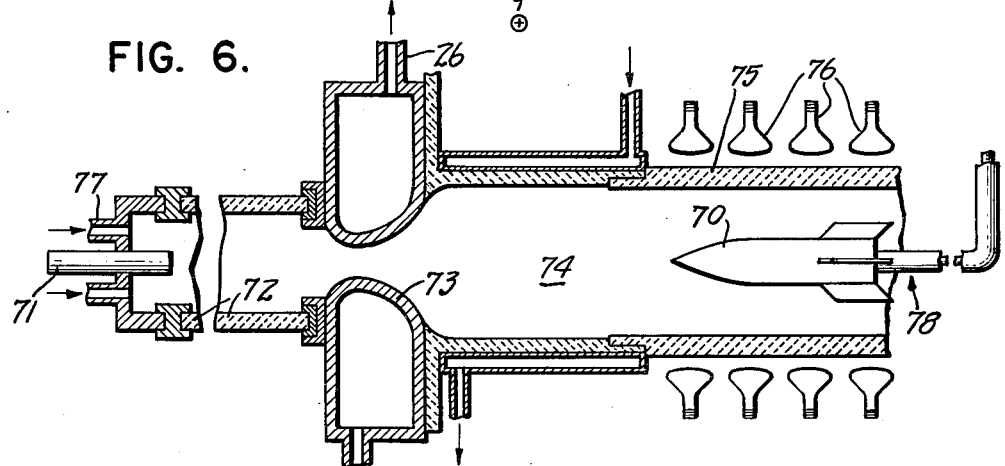
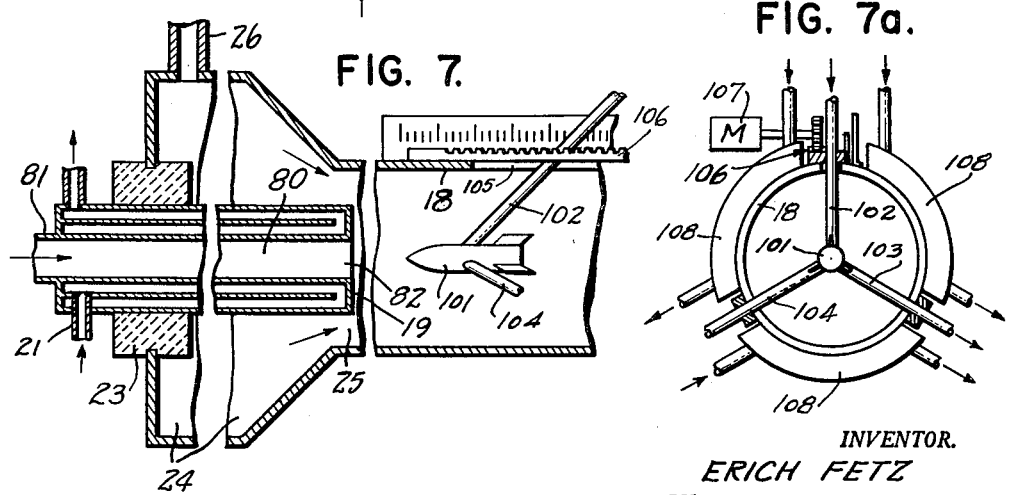

United States Patent Office 3,029,635
Patented Apr. 17, 1962

3,029,635
HIGH-TEMPERATURE TESTING APPARATUS
Erich Fetz, Cupsaw Lake, N.J., assignor to Amalgamated Growth Industries, Inc., New York, N.Y., a corporation of Delaware
Filed July 9, 1956, Ser. No. 596,748
16 Claims. (Cl. 73—147)

My invention relates to high-temperature testing or "wind-tunnel" apparatus, that is, to apparatus capable of establishing high-temperature regimes in which various materials and devices may be tested, as when missile and airplane shapes and materials are to be evaluated in the laboratory under synthesized flight conditions.

The interest of science and technology in high and very high temperatures has gained momentum in recent years, particularly in application to the field of guided missiles and jet or rocket-propelled airplanes flying at several times the speed of sound. Developments in this field hinge not only on fundamental knowledge of the physical properties of air heated to very high temperatures at various stages of rarefaction, but it is also essential to learn and identify the properties of man-made construction materials at these high temperatures; these properties must be ascertained both under quiescent conditions and in the presence of additional strains imposed by fast-moving gaseous streams, as at the outer skin or in the combustion chamber of a missile.

It is, accordingly, an object of the invention to provide an improved wind-tunnel means whereby high-temperature and high gas-flow conditions may be established, for ground-based simulation of extreme flight conditions.

A specific object is to provide a versatile means for exposing solid bodies to very high temperatures; the solid bodies may be, for example, aircraft, missile or rocket components of high-temperature materials, such as cermet and refractory-oxide coatings—in short, any substance exposed either to stationary gaseous media at extreme temperatures or creating at its outer surface high-temperature conditions due to friction when traveling at hypersonic speeds.

In addition to providing a means for observing the effects of temperature (i. e. of heat), it is a further specific object of this invention to provide for the possibility of exposing bodies and substances of the character indicated to the effect of fast-moving gaseous currents, as of air, steam, combustion gases, inert gas, or the like, moving at various or varying speeds up to several times the speed of sound.

It is another object to meet the above objects with means for additionally exposing solid bodies to very high temperatures in rarefied gaseous media, whereby one may simulate flight conditions of a space satellite or high-altitude rocket.

It is a further object to achieve the above objects with means additionally capable of simulating radiation, ozone, and meteoric-dust conditions encountered in high-speed high-altitude flight.

Another object of this invention is to provide improved means whereby materials and structural parts intended for high-temperature service may be subjected to quantitative laboratory determinations of maximum heat resistance, rates of heat absorption, thermal conductivities, resistance to thermal cycles of predetermined severity, and whereby precise convective heating and cooling programs may be more readily pursued.

Inasmuch as the effective, full use of very high temperatures is at present restricted by the lack of suitable construction materials capable of withstanding such high temperatures (with or without additional aggravating influences), air-film and sweat-cooling techniques must be employed to obtain structural endurance, as in rocket and jet-engine combustion chambers, under such high-temperature service conditions; it is thus an object to provide testing facilities which make it possible to quantitatively study air-film and sweat-cooling techniques, with a view to reducing this indispensable countermeasure to an absolutely necessary minimum.

It is a further object of this invention to provide means whereby fundamental thermodynamic studies of dissociated, highly ionized gases may proceed under "steady-state conditions," that is, for finite periods, of time, in contradistinction to the highly transient conditions which characterize use of the shock tube, and which restrict experimental shock-tube observation to microseconds or even fractions thereof.

In addition to achieving simulated "steady-state conditions" over finite periods of time, it is an object to provide for controlled variation of these conditions, as when simulating service conditions where temperature, velocity, pressure, gas composition, ultraviolet radiation and other variables are changing individually or simultaneously in a wide variety of shifting conditions; specifically, for example, it is an object to provide means for simulating "re-entry conditions" of a missile plunging from high altitudes into the increasingly dense atmosphere.

In general, the objects of this invention are four-fold, viz. to provide laboratory facilities which permit:

(1) Simulating a wide range of service conditions including the simultaneous effects of low or high pressures, of fast-moving gas currents, of different gaseous media, of ultraviolet and other radiations, singularly or in any combination;

(2) Studying quantitatively the effects of high-temperature conditions upon materials and structures exposed to the extreme conditions referred to in (1);

(3) Evaluating special techniques which will help to protect such materials against the destructive effects of extreme conditions of the character indicated; and (4) Furnishing fundamental scientific data in order to establish a foundation of very high temperature technology and science.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIGS. 3 to 8 are fragmentary longitudinal sectional views illustrating further modifications, except that FIG. 7a is a simplified right-end view of FIG. 7;

FIGS. 9 and 10 are fragmentary longitudinal sectional views of alternative upstream-electrode configurations for use in or in combination with the devices of FIGS. 1 to 8;

FIGS. 9a and 10a are right-end elevations of the electrodes of FIGS. 9 and 10, respectively; and FIGS. 11 and 11a schematically illustrate a downstream-electrode construction.

Briefly stated, my invention contemplates employment of a so-called Rava-type electric-arc torch as the primary means by which the simulator regimes of the invention are established; such a torch is disclosed in detail in copending Rava application Serial No. 482,513, filed January 18, 1955, now Patent 2,768,279. For present purposes, it suffices to state that such a torch comprises an elongated arc chamber through which a continuous gas flow is established. An electric arc is struck between a generally central upstream electrode and an annular downstream electrode, which may be the discharge nozzle for the torch chamber. According to my invention, high-altitude flight conditions are simulated when a specimen or model is placed either within the arc chamber or in a special downstream chamber receiving the direct discharge of exhaust products from the torch. Various auxiliary means for achieving further special-purpose simulated effects are also shown and described.

Figure 1:
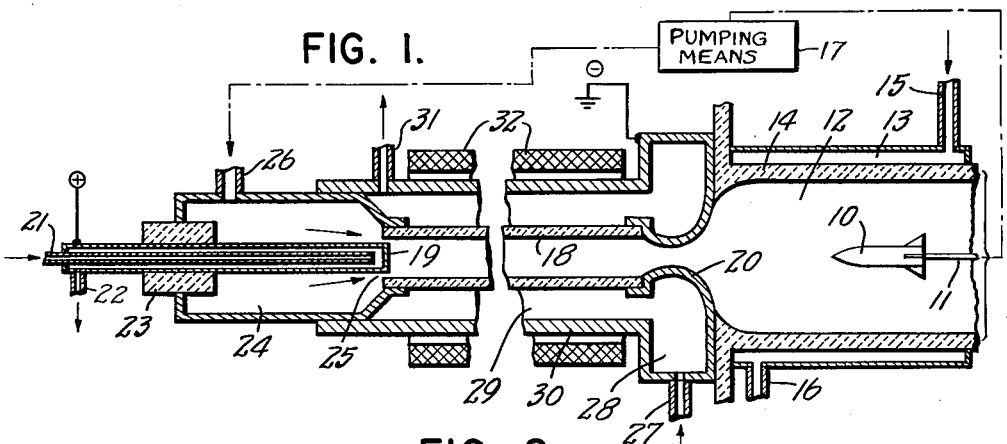
FIG. 1 is a simplified longitudinal sectional view of a high-temperature regime-simulating device incorporating features of the invention.

Referring to FIG. 1 of the drawings, my invention is shown in application to a simulating device for the testing and observation of a model or specimen 10 supported by means 11 within a test chamber or region 12. The region 12 may be defined by a generally cylindrical envelope 13, which may be lined with refractory material 14. The envelope 13 is shown to be formed with a double wall so that continuous flow of coolant may be circulated between an inlet 15 and an outlet 16. Continuously discharging into the upstream end of the chamber 12 is an electric-arc torch of the so-called Rava type. Said torch may comprise an elongated arc chamber having an inner wall lined, if desired, with a cylinder 18 of refractory material; in the form shown, cylinder 18 is preferably porous and alone constitutes the inner wall. An upstream electrode 19 is centrally placed near the upstream end of the chamber 18, and an annular downstream electrode 20 is formed as a nozzle for the discharge of torch products into chamber 12.

The upstream electrode 19 is shown to be cooled by a concentric-flow arrangement involving an inlet 21 and an outlet 22. The electrode 19 is an elongated tube which, for flexibility of application, is preferably longitudinally adjustably positioned in a guide 23 which may be of insulating material and may form part of the torch chamber or frame structure. As explained in greater detail in said application, a gas-feed chamber 24 preferably forms the upstream end of the torch and communicates with the arc chamber by means of an annular inlet 25. Gas inlet to the chamber 24 is suggested at 26. Ordinarily, air is fed under pressure at the inlet 26, but for certain applications, inert gases such as nitrogen, are desirable and, in that event, I prefer to employ a closed-cycle system wherein exhaust inert gas is recovered at the outlet of chamber 12 and is recirculated for feeding under pressure at the inlet 26. The means for accomplishing this will be understood and are merely suggested at 17 in the drawing.

For cooling purposes, I prefer that the downstream electrode 20 shall be of relatively thin electrically conductive material, such as copper, and that a continuous supply of coolant shall be directed not only to the surfaces of the electrode 20, but also to the inner wall 18 of the arc chamber. Thus coolant is shown being admitted at an inlet 27 to an annular manifold 28 at the downstream electrode. Manifold 28 communicates with a chamber cooling jacket 29, defined by an outer cover or sleeve 30 radially spaced from the inner wall 18. This cooling mechanism is shown exhausting at 31.

In operation, a continuous arc is developed between the electrodes 19—20, and the action of the gas admitted at 26 is to confine the arc centrally of the chamber 18. The configuration of the downtsream electrode 20 is such as to promote discharge of the arc therethrough. For greatest concentration of arc plasma, the gas flow along the arc chamber should be swirling in a single generally helical progression, as determined either by the manner in which inlet 26 joins the chamber 24, or by the manner in which gas is passed from the chamber 24 to the arc chamber 18, as by the employment of inclined vanes (not shown) at 25. Greater focusing and concentration of the arc plasma may be achieved by electromagnetic focusing means suggested at 32, in the form of an elongated coil coaxial with the arc flow and generally coextensive therewith. Both the arc and the electromagnetic focusing may be excited by alternating current, appropriately phased to achieve the desired results; alternatively, direct current may be employed, as suggested by the polarity legends in the drawing.

In use, the model or specimen 10 may be placed either inside the arc chamber 18 or within the downstream chamber 12, as shown. With a proper proportioning of the model or specimen size to the effective cross section of the heat-flux discharge from the torch, the model may be subjected substantially uniformly to high-temperature high-flow conditions, which may simulate certain conditions encountered in extreme high-speed, high-altitude flight. Instrumentation sensing model deflection, local pressures, surface temperatures, strains and the like may be telemetered by appropriate mechanisms connected to other laboratory instrumentation by way of the support stem 11, all in accordance with well-known wind-tunnel testing techniques. If the model must be viewed directly, Pyrex windows (not shown) may be installed in the chamber 12, and if there is sufficient swirling action of gas flow introduced at 25, it is also feasible to locally fabricate the wall of chamber 18 of glass at a given viewing section. In the particular configuration represented in FIG. 1, the model-observation chamber 12 is of substantially greater cross-sectional area than the arc chamber, and this general relationship will be appreciated as improving laminar flow, as well as preserving heat and greater uniformity of heat distribution over the model 10 under test.

As a means of developing high torch-exit velocities with the device of FIG. 1, the coolant introduced at 27 may be liquid, such as liquid air, and the porous wall 18 may be of relatively small diameter compared to its effective length, such liquid being introduced under pressure after the arc has first been struck. Under such circumstances, and with sufficient liquid-air pressure to cause substantial flow through the pores of wall 18, the arc will be closely confined in chamber 18, thereby markedly elevating the arc temperature and causing very high exit-flow speeds at nozzle electrode 20.

Figure 2:
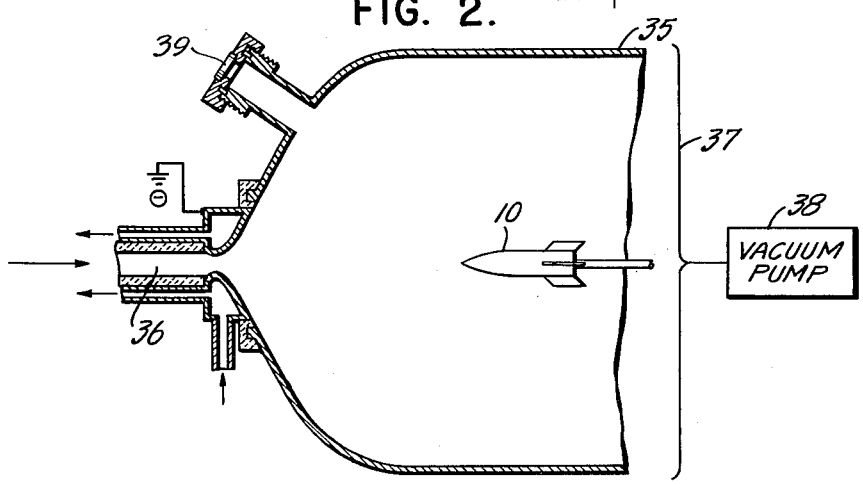
FIG. 2 is a fragmentary view similar to FIG. 1 and showing a modification.

The arrangement of FIG. 2 represents the same general scheme as that of FIG. 1, except that the downstream or test chamber 35 is of very substantially greater cross-sectional area than that of the arc chamber 36. This change in area may be of the order of 100:1, so that there may be a very substantial drop in ambient pressure upon diffusion into the chamber 35. To produce further reduced pressure, I have schematically indicated at 37 that the chamber 35 discharges into a strong vacuum-pump system 38, as, for example, a large evacuated tank pumped by several multi-stage steam ejectors. The high temperature and reduced pressure to which the model 10 may then be subjected will be appreciated as simulating conditions which may be encountered in space flight. If desired, model 10 may be viewed through a port 39 containing a Pyrex window.

Figure 3:
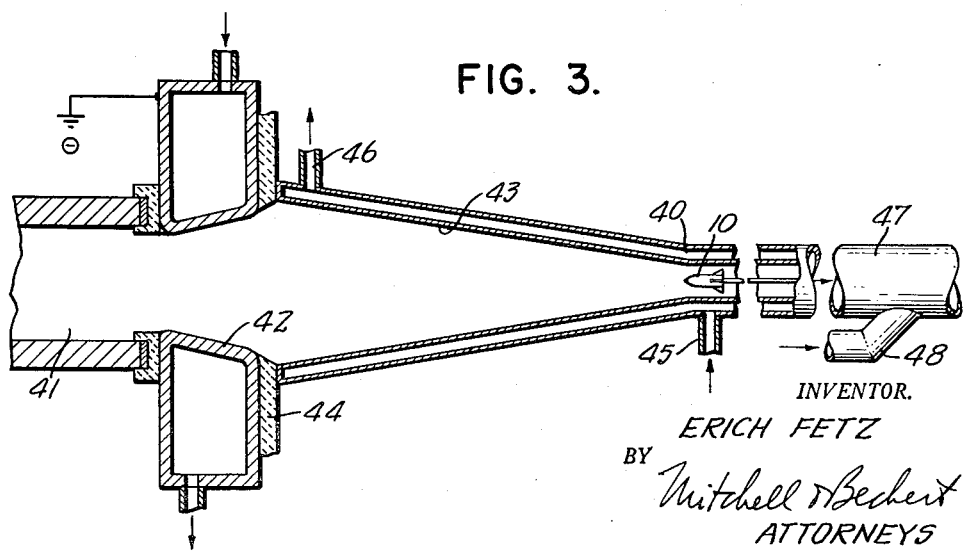

FIG. 3 represents a further variation of the general test organization depicted in FIG. 1. In FIG. 3 the model 10 is supported within a test chamber wall 40 of reduced cross section compared with that of the arc chamber 41 of the torch. In fact, the downstream electrode 42 of the torch is shown to provide essentially no constriction to arc-discharge flow. The test section 40 may be at the end of a gently converging section 43, connecting the same to the downstream end of the torch. Insulating means 44 is shown completing the connection, and the converging section 43 is preferably cooled, as by coolant flow from an inlet 45 to an outlet 46. Reduced pressures in the test section are promoted by means of a jet-exhaust pump 47, as operated by a substantial steam flow introduced at 48. It will be appreciated that in the arrangement of FIG. 3, the converging section 43 permits the development of relatively high gas pressures at the test section in addition to those due inherently to thermal expansion by reason of torch operation. Moderate free-stream velocities at very high temperatures and elevated pressures are obtained by this arrangement.

Although liquid cooling has been described in connection with the converging chamber wall 43, it will be understood that this is merely a suggestive mechanism and that sweat-cooling or laminar gas-film cooling or other means may be employed to lower the chamber-wall temperature. By drastically reducing the size of the test section 40 compared with that of discharge from the torch, pressures may be built up to a considerable extent, and test specimens may be subjected to the effect of various gases or gas mixtures under such pressures; the gases and gas mixtures may be completely realistic, that is, they may duplicate those encountered in the flight regime under investigation.

It has been suggested above that the arrangement of FIG. 3 permits a gain in free-stream velocities. Relatively speaking, this is a somewhat limited effect. Further increases in free-stream velocity may be achieved by adding combustible gases at the inlet 26 to the torch gas chamber. Alternatively, powdered combustible substances may be introduced with the main gas flow at this location. Preferably, these gases or powdered substances are of high exothermic value so that substantial heat may be added to the system. This may be accomplished by adding part or all of the combustible gas or powder in a non-oxidizing or reducing atmosphere near the upstream electrode 19, thus stabilizing the Rava torch and accomplishing preheating at the same time; under these circumstances, relatively great heat release may be achieved within the chamber 43—40 if the combustion air or oxygen is fed in the system in the direction of the plasma-gas stream near the downstream electrode 42, or, in the case of liquid-air or oxygen, through the nozzle-electrode itself. In the latter connection, FIG. 4 illustrates a specific structure by means of which this downstream-injection function may be achieved.

In FIG. 4, the wall 50 represents the downstream end of the arc chamber, and the nozzle 51 is the downstream electrode. A plurality of injection openings 52 communicates with the chamber 50 at a location upstream from the throat of nozzle electrode 51, and the axes of injection openings 52 are preferably directed downstream so as to intersect substantially at the throat of nozzle electrode 51. Cooling for the electrode 51 is shown to include multiple inlets 53, supplying a manifold 54 surrounding the electrode 51, and exhausting at plural outlets 55. The test chamber suggested at 12 will be appreciated as being one of the configurations shown in FIGS. 1, 2 and 3, depending upon the desired model-test simulated regime.

Although the coupling of combustion processes with the high-temperature Rava-arc torch considerably increases the free-stream velocities as encountered in extreme high-altitude flight, the latter still falls short of those desirable for ultimate advanced supersonic-flight research. In order to simulate such conditions in the laboratory, this invention provides for use of the steady Rava-arc torch or clusters thereof in conjunction with a rapidly pulsed arc torch, or a number of arc discharges fired in rapid rotation, all as suggested by FIG. 5.

In the arrangement of FIG. 5, an explosion chamber or shock-wave generator 58 provides a means whereby transient supersonic flows may be developed under controlled conditions and discharged through a nozzle 59 into a flight-test simulating chamber 60; a model 61 is shown supported in chamber 60; preferably in axial alignment with nozzle 59. The generator 58 may be generally spherical and may be supplied by a pulsed compressed-air mechanism 56, the pulsations of which are synchronized by means 56' with arc discharge between two opposed electrodes 57—57'; energy for discharge across electrodes 57—57' may be released by means 56', from banks of high-voltage capacitors, recharged in the intervals between discharges. The chamber 60 is shown also supplied by a plurality of Rava-type arc devices 62—63 which may be equally angularly spaced around the upstream end of the chamber 60 and so oriented as to discharge generally in the downstream direction into chamber 60. Electromagnetic focusing means 64 serves to improve arc focusing and to straighten the flow to which the model 61 is subjected. While the arc devices 62—63 are very schematically shown in FIG. 5, each will be understood to include an upstream electrode 65 and an annular downstream electrode 66 at the respective ends of an arc chamber 67. The means for supplying continuous gas flow in the devices 62—63 of FIG. 5 are not shown, but will be understood; also, vacuum inducing means will be understood to be connected to the downstream end of chamber 60 in order to simulate rarefied atmospheric conditions, in which event, gas flows in the arc devices 62—63 may be minimal.

In use, the Rava-arc devices 62—63 are continuously operated, and the chamber 58 is operated as a source of rapidly intermittent explosions, all discharging through the throat 59 into the test chamber 60. While resulting compression sound waves which emerge from the throat 59 might interfere with operation of a Rava-arc torch if they originated in the chamber 18 of FIG. 1, no interference is realized in the configuration of FIG. 5, because independent operation and discharge of devices 58—62—63 is possible.

In the arrangement of FIG. 6, I show a modification wherein further realistic simulation of high-altitude conditions is achieved by introducing relatively high ultraviolet radiation and ozone content into the atmosphere in which the test model 70 is placed. In FIG. 6, the upstream electrode 71, arc chamber 72, and downstream electrode 73 will be recognized as parts of the arc torch discharging into the test region 74. At the location of the model 70, the wall 75 of the chamber 74 is preferably locally transparent to ultraviolet radiations, and batteries of ultraviolet lamps 76 are shown directed into the test region. The rear section 75 of the test chamber may be of quartz glass, so that a substantial ultraviolet flux may enter the test section. Although the arc proper may develop certain ozone concentrations in the vicinity of the model 70 when air is the torch gas, introduced at 77, higher ozone contents may be provided by feeding oxygen-enriched air or pure oxygen into the arc chamber 72 near the downstream electrode 73, as in the case of FIG. 4, or at the upstream electrode, as at inlet ports 77.

FIG. 6 additionally illustrates how controlled rates of heating and heat transfer may be observed in the test model 70, as by providing suitable tubing in the model support structure. FIG. 6 illustrates my preference for twin tubing, as, for example, concentric tubes designated generally 78 within the model support stem. Such tubing may carry compressed air, water or other coolant which, in the case of twin tubing or concentric tubing, may be recirculated, but which, in other situations, may be discarded or collected for thermal measurements or permitted to escape through a porous return tube to "sweat-cool" the support of the test specimen. Temperature and other measuring devices at selected locations on the model 70 may include high-temperature thermocouples and pressure and strain-sensitive devices having electrical connection to other laboratory instrumentation by way of the support structure 78; to protect the overall support structure from the corrosive effects of continuous exposure to the arc-torch exhaust stream, I prefer to sheath the support structure 78 with refractory tubular shielding (not shown).

In FIG. 7, I illustrate in somewhat greater detail the upstream end of a torch of the general variety illustrated in FIG. 1. Corresponding parts have therefore been given the same reference numerals, the principal difference being that in FIG. 7 the upstream electrode 19 is of hollow annular construction so as to define an internal through passage 80 for accommodation of gas flow admitted at 81 and discharging through the center 82 of the electrode face and therefore generally into the center of the arc plasma issuing downstream from the electrode 19. The electrode 19 is preferably utilized in conjunction with alternating-current excitation, so that the instantaneous location of arc impingement on the electrode 19 may shift readily and therefore not develop a hot center for prolonged localized attachment to the electrode surface. Under these circumstances, the arc discharge tends to develop more uniformly over a larger central section of the arc chamber 17, and the electromagnetic focusing means 32 assures even greater uniformity of heat development in the central part of the arc-chamber section. This will be appreciated as facilitating the establishment of a model-test region within the arc chamber 18 itself.

The means for supporting model 101 in the test region 17 of FIG. 7 is shown in FIGS. 7 and 7a, and is shown to comprise a plurality of angularly spaced, forwardly inclined, radial struts 102—103—104. These struts are supported on individual blocks, guided in longitudinal ways (as at 105) formed in or secured to chamber 18. Rack and motor means 106—107 serve for longitudinally adjustable positioning of model 101 for test or during a test. The model 101 may be cooled by continuously flowing coolant entering through an inlet passage in strut 102 and leaving through strut 103, while strut 104 serves to contain instrumentation wiring connected to the various sensing devices (not shown) on model 101. The model-test section of chamber 18 is shown cooled by separate arcuate cooling manifolds 108 substantially surrounding chamber 18.

The effect of the impact of dust particles from say, meteoric showers on ballistic missiles or satellites flying at high altitudes, constitutes—at times—another destructive effect, the extent of which should be quantitatively studied in the laboratory. Inasmuch as the high temperature Rava arc would liquify or even volatilize such particles on prolonged exposure to the effect of the electric arc, and since the momentum rather than the composition of the impacting particles constitutes the important criterion, this invention prefers the use of high melting, high-density materials (such as tungsten carbide) readily available in various sieve fractions, for subjecting test specimens in my electric wind tunnel to the effect of mechanical impacts. The most suitable location for entering the flight simulator is somewhat downstream of the ring or downstream electrode by means of a highly compressed gaseous medium; alternatively, such particles may be introduced with the compressed air in the chamber 58 of FIG. 5. A third approach employs an electromagnetic gun, and iron-nickel or cobalt-base particles are introduced through the ring electrode at speeds greatly in excess of the arc plasma, so that the former will not be materially heated by the latter; such a gun may be directed down the passage 81 of FIG. 7, as will be understood.

The arrangement of FIG. 8 follows generally the organization depicted in FIG. 7, except for a change in contour of the downstream end of the upstream electrode 83. A continuous flow of fluid may be passed through the central conduit 84 of the electrode 83 for discharge into the center of the arc flux. The relatively small downstream end face 85 of the electrode 83 permits development of a more concentrated annulus of arc plasma, and by generally conforming the outer contour 86 of the downstream electrode 83 to the converging arc chamber wall 87, there is developed at 88 an elongated passage through which torch gas supplied to the gas chamber 24 may serve a cooling function for the downstream end of the electrode 83. A quartz viewing section 89 for a model 90 under test is suggested at 89.

FIGS. 9 and 9a represent enlarged fragmentary views of the downstream end of the upstream electrode, for situations in which even greater uniformity of arc-flux development is desired across the arc-chamber cross-section, so as to produce more uniform conditions in which to expose the model for test. The electrode of FIGS. 9 and 9a may comprise an outer elongated tube 91 with concentric inner tubes 92—93 permitting counter-flow coolant circulation, as suggested by the arrows 94. Within the inner tube 93, gas flows may be accommodated as suggested by arrow 95, and the downstream face or target or striking surface of the electrode comprises a plurality of projecting electrode members 96 having central openings through which the gas flow 95 may be accommodated; the projecting electrode elements 96 may be insulated from each other and separately excited with respect to the downstream or ring electrode (not shown), but in the form shown, all elements 96 are formed together and are therefore excited in common. It will be appreciated that each of the electrode projections 96 may be generally analogous to the single projecting electrode portion 85 of FIG. 8, and that under conditions of sufficiently strong electrical excitation, effectively simultaneous arcs may be developed from each electrode projection 96 so as to develop arc discharge more uniformly over the chamber cross-section. If the fluid introduced in the flow 95 is such as to add heat to the system in the region of arc discharge, then uniform high-heat flux is achievable in the arc chamber.

In the arrangement of FIGS. 10 and 10a, the organization is generally the same as described for FIGS. 9 and 9a, except for the additional provision of orifices 97 between projecting electrodes 96. Also counter-flow cooling is achieved centrally within the electrode of FIGS. 10 and 10a, as within inner and intermediate tubes 98—99. The fuel-gas flow suggested by arrow 100 is, in FIGS. 10 and 10a, introduced in the outer jacket or manifold.

In the arrangement of FIGS. 11 and 11a, the upstream electrode has a target or striking surface characterized by a plurality of longitudinal rods or electrode elements 110, and ports 111 for introduction of fuel-gas flow are provided between elements 110. Cooling is accomplished in the counterflow system described for FIGS. 10 and 10a, and fuel gas is manifolded outside the cooling mechanism, as suggested by arrows 100.

It will be seen that I have described improved simulation equipment, which for purposes of missile testing may be viewed as an electric wind tunnel having great flexibility to simulate a wide variety of flight conditions. Not only is it capable of developing intense heat at high flow rates, but it may also subject the test specimen to rarefied atmospheres enriched with ozone, to ultraviolet radiation, and to simulated meteoric dust. The intense heat may be due primarily to arc heating or, in the case of an exothermic (fuel) gas supplied to the torch, substantial further heat releases may be achieved. The torch develops substantial quantities of ionized products which are susceptible to influence and control by external electro-magnetic fields, as produced by means 32—64; such fields can accelerate the ionized stream, add substantial energy to the flow at the test section, prevent premature recombination of disassociated molecules, and create laminar flow or turbulence, as desired.

For the purpose of subjecting high-temperature materials, coatings, structural members, etc., to predetermined convective heating and cooling or to thermal cycling programs, a maximum degree of flexibility is provided for:

(a) By determining the rate of heat absorption of specimens by means of calorimetric measurements via the internal coolant of the specimen (78 in FIG. 6; 102—103 in FIG. 7a);

(b) By synchronizing reduced arc inputs or arc extinguishing times with increased flows of compressed air fed into the system at the best suited spot along the arc or secondary chamber (FIG. 5), or in extreme cases by water sprays directed upon the test specimen;

(c) By increased rates of internal cooling of the body under test;

(d) By moving the test specimen automatically and at regular intervals from a position outside of the Rava arc torch into a position furnishing the desired high temperature and thermal-energy flow (e.g. into the visible portion of arc discharge immediately downstream from the downstream electrode).

As to the design of the upstream electrode or electrodes, considerable flexibility is insured by a number of modifications intended for high-temperature laboratory tests of bodies or for thermodynamic studies of gases at very high temperatures, viz:

(a) A hollow water-cooled double-walled tubular electrode (82) with compressed air (fed in duct 81) emerging through the center (FIG. 7);

(b) A hollow rod-shaped, preferably internally cooled, tipped electrode with gases, air, or liquids emerging through the tip (FIG. 8);

(c) A cluster of equally spaced, rod-shaped electrodes (96) with compressed air, combustible gases, steam or other gaseous medium emerging in the center of the electrodes arranged in a circular manner (FIGS. 9-10);

(d) A bundle of narrowly spaced, pencil-like electrodes (110) spaced by means provided with a large number of holes (111) through which the test gas, gaseous mixtures or evaporating fluids such as liquid air may be intimately mixed with the arc plasma (FIGS. 11 and 11a).

In order to obtain certain testing conditions, the downstream nozzle-shaped electrode may also be modified, as in the following ways:

(a) The water-cooled doughnut electrode may be shaped like a trumpet so as to flare and blend structurally with an enlarging secondary chamber (e.g. 73—74, in FIG. 6);

(b) A nozzle electrode (51) of greatly reduced cross-sectional area fitted onto a markedly tapered arc chamber (50) may be internally cooled by water (injected at 52) under high pressure and velocity, and it may be externally cooled by a film of cold gas or evaporating liquid, such as liquid air bled into the arc chamber at the chamber-nozzle interface (e.g. 52 in FIG. 4);

(c) Highly compressed air, combustible-gas mixtures or preheated inert gases are introduced, preferably tangentially and at an acute angle to the axis of the arc at the downstream end of the arc chamber interface or through the open nozzle (e.g. at 52, in FIG. 4) in order to obtain certain chemical physical, electrical or mechanical effects singly or in combination.

The confinement in the enclosed Rava arc-torch chamber of a plasma stream of several thousand degrees Kelvin which would ordinarily melt and vaporize any solid material on earth, constitutes an astounding proof of the effectiveness of the thermal and electrical insulating power of a gaseous medium. Whereas this protective gas film represents an indispensable asset in the case of the Rava arc torch, it does call for special cooling techniques in certain cases. For example, quantitative studies of air- (or gas) film cooling and of sweat-cooling techniques may be pursued by the following modifications of the Rava-arc torch chamber:

(a) The downstream electrode (e.g. 51, in FIG. 4) may be used as the model of the nozzle in rocket, jet and other combustion chambers; it is cooled by measured quantities of gaseous coolant(s) introduced at the nozzle chamber interface (e.g. at 52), while the cooling effect is conveniently determined by the temperature rise in the cooling water of the downstream electrode (e.g. temperature difference for coolant at 53 and at 55);

(b) A double-walled Rava arc torch chamber is provided with an inner wall (18, FIG. 1) of defined porosity, and measured amounts of liquid coolants are pressed through the arc-chamber wall. Provisions may be made to replace the inner porous tube (18) with tubes possessing different diameters and/or varying degrees of porosity. The perspiration cooling efficiency is determined by the temperature rise of the inner tube wall while all other variables are held constant.

Whereas the above described modifications of the Rava arc torch are aiming at steady-state conditions, i.e. at testing conditions where temperature, pressure, velocity, gas composition, ultraviolet radiation and all other possible variables are held at definite, predetermined levels or magnitudes over sufficiently extended testing periods, the following adaptations of the electrical Rava torch are intended to pursue the four above-mentioned high-temperature research programs under shifting conditions, whereby any and all variables are subjected to preconceived changes in a methodical manner; viz.

I. Temperature:

(a) Change of electrical input;
(b) Striking of additional arcs in cluster arrangements;
(c) Gradual addition of energy to system by external fields or radiation;
(d) Increased pre-heating of arc-stabilizing air;
(e) Substitution of (d) by increased quantities of combustible gases;
(f) Increased "squeezing" of arc discharge.

II. Velocity:

(a) Increase of air pressure;
(b) Greater overheating by raised arc temperature;
(c) Increasing the number of units exhausting the tandem chambers;
(d) Acceleration of plasma gas stream by gradually increasing external fields.

III. Pressure:

(a) Restricting cross-sectional area(s) of orifice(s) located at end of secondary chamber;
(b) Increase of degree of overheating by changes in electrical input;
(c) Gradual addition of combustible gases of high exothermic value;
(d) Increase in pressure of arc-stabilizing air or gaseous medium.

IV. Other variables such as increasing the amount of:

(a) Ultraviolet irradiation;
(b) Ozone as specifically encountered at higher altitudes, through pre-set timers, relays, electronic circuits, etc.; these factors present no undue electrical or mechanical difficulties.

Increasing the ozone content in the test chamber is conveniently carried out by increasing the amounts of either oxygen-enriched air or by feeding into the system more and more pure oxygen, part of which will be transformed into ozone by the electric arc.

The choice of the most suitable method of changing variables listed above naturally depends on the intended application or simulation. For instance, reproducing the "re-entry conditions" in the "rocket flight simulator" when a rocket is decelerating and dangerously heating up due to the increased resistance in air strata of increasing density may be best accomplished by simultaneously applying the methods of items I(a–d) and III(b), noted above.

While I described my invention in detail for the preferred forms shown, it will be understood that modifications may be made within the scope of the invention, as defined in the claims which follow.

I claim:

1. Wind-tunnel apparatus, comprising an elongated tubular chamber, means for establishing and controlling a gas flow through said chamber, an upstream generally centrally located electrode coaxially disposed and in said chamber, an annular downstream electrode longitudinally spaced from said upstream electrode and forming part of the wall of said chamber, means for electrically exciting said electrodes with a potential sufficient to maintain an electric arc between said electrodes and within said chamber, whereby gas flow in said chamber is heated, and specimen-supporting means within said chamber in a region of heated gas flow.

2. Wind-tunnel apparatus according to claim 1, in which said chamber includes, in the region of said last-defined means, viewing means aligned with the specimen supported thereby.

3. Simulation apparatus, comprising an elongated tubular chamber, means for directing and controlling a gas flow through said chamber, an upstream generally centrally located electrode coaxially disposed and in said chamber, an annular downstream electrode longitudinally spaced from said upstream electrode and forming part of the wall of said chamber, means for establishing an electric arc within said chamber and between said electrodes, and means for supporting a test specimen in the arc region between said electrodes.

4. Simulator apparatus, comprising an elongated tubular chamber, means for directing and controlling a gas flow through said chamber, an upstream generally centrally located electrode coaxially disposed and in said chamber, an annular downstream electrode longitudinally spaced from said upstream electrode and forming part of the wall of said chamber, means for establishing an electric arc between said electrodes and within said chamber, whereby gas flow in said chamber is heated, and specimen-supporting means within said chamber in the region downstream from said downstream electrode.

5. Simulator apparatus according to claim 4, in which the effective cross-sectional area of said chamber at the region of specimen support is substantially larger than that in the region of arc discharge.

6. Simulator apparatus according to claim 4, in which the effective cross-sectional area of said chamber at the region of specimen support is substantially smaller than that in the region of arc discharge.

7. Wind-tunnel apparatus, comprising an elongated tubular chamber, means for directing and controlling a gas flow through said chamber, an upstream generally centrally located electrode coaxially disposed and in said chamber, an annular downstream electrode longitudinally spaced from said upstream electrode and forming part of the wall of said chamber, the wall of said chamber between said electrodes including a porous section, means for establishing an electric arc between said electrodes, means for forcing a gaseous liquid under pressure through said porous section, whereby the arc within said chamber is further confined and gas heating is promoted, and specimen-supporting means within said chamber within a region of heated gas flow.

8. Wind-tunnel apparatus, comprising an elongated tubular chamber, means for directing gas flow through said chamber, an upstream generally centrally located electrode in said chamber, an annular downstream electrode longitudinally spaced from said upstream electrode and forming part of the wall of said chamber, means for electrically exciting said electrodes with a potential sufficient to maintain an electric arc between said electrodes and within said chamber, whereby gas flow in said chamber is heated, specimen-supporting means within said chamber in a region of heated gas flow, said chamber in the region of support of said specimen including a wall portion transparent to ultraviolet radiation, and means for directing ultraviolet radiation radially through said transparent section.

9. Wind-tunnel apparatus, comprising an elongated tubular chamber, means for directing a gas flow through said chamber, an upstream generally centrally located electrode in said chamber, an annular downstream electrode longitudinally spaced from said upstream electrode and forming part of the wall of said chamber, means for electrically exciting said electrodes with a potential sufficient to maintain an electric arc between said electrodes and within said chamber, whereby gas flow in said chamber is heated, specimen-supporting means within said chamber in a region of heated gas flow, said specimen-supporting means including at least three angularly spaced radial struts connecting the specimen to the chamber test section for longitudinally adjustably positioning the specimen along the axis of said chamber, and cooling means for the specimen including a coolant inlet passage in one of said struts and a coolant outlet passage in another of said struts, whereby the third of said struts may be available to serve instrumentation by said specimen.

10. Wind-tunnel apparatus, comprising an elongated tubular chamber, means for directing and controlling a gas flow through said chamber, an upstream generally centrally located electrode in said chamber, an annular downstream electrode coaxially disposed and longitudinally spaced from said upstream electrode and forming part of the wall of said chamber, means for electrically exciting said electrodes with a potential sufficient to maintain an electric arc between said electrodes and within said chamber, whereby gas flow in said chamber is heated, and specimen-supporting means within said chamber in a region of heated gas flow, said chamber including an annular cooling manifold surrounding the same and extending longitudinally for substantially the region between said electrodes.

11. Wind-tunnel apparatus, comprising an elongated tubular chamber, means for directing a gas flow through said chamber, an upstream generally centrally located electrode in said chamber, an annular downstream electrode longitudinally spaced from said upstream electrode and forming part of the wall of said chamber, means for electrically exciting said electrodes with a potential sufficient to maintain an electric arc between said electrodes and within said chamber, whereby gas flow in said chamber is heated, and specimen-supporting means within said chamber in a region of heated gas flow, said chamber including in the region of support of the specimen, an annular cooling manifold surrounding the same.

12. Wind-tunnel apparatus, comprising an elongated tubular chamber, means for directing and controlling a gas flow through said chamber, an upstream generally centrally located electrode in said chamber, an annular downstream electrode coaxially disposed and longitudinally spaced from said upstream electrode and forming part of the wall of said chamber, means for electrically exciting said electrodes with a potential sufficient to maintain an electric arc between said electrodes and within said chamber, whereby gas flow in said chamber is heated, specimen-supporting means within said chamber in a region of heated gas flow, and an elongated electromagnetic winding surrounding said chamber at a region of heated gas flow and upstream from said specimen-supporting means.

13. Simulator apparatus, comprising an elongated tubular chamber, a plurality of separate arc chambers communicating with the upstream end of said tubular chamber, each of said arc chambers comprising an upstream electrode and an annular downstream electrode spaced by tubular means, means for establishing separate electric arcs between the electrodes of each of said arc chambers, whereby the heated products of said flows may be discharged into said tubular chamber, and specimen-supporting means within said tubular chamber in a region of heated gas flow.

14. Simulator apparatus according to claim 13, and including an electromagnetic focusing coil intermediate said arc chambers and said specimen-supporting means.

15. Simulator apparatus, comprising an elongated tubular chamber, a plurality of separate arc chambers communicating with the upstream end of said tubular chamber, each of said arc chambers comprising an upstream electrode and an annular downstream electrode spaced by tubular means, means fo restablishing separate electric arcs between the electrodes of each of said arc chamber, means for inducing separate gas flows through said arc chambers, whereby the heated products of said flows may be discharged into said tubular chamber, a supersonic-flow generator discharging into said tubular chamber upstream from said arc chambers, and specimen-supporting means within said tubular chamber in a region of heated gas flow and in general alignment with the discharge axis of said generator.

16. Simulator apparatus according to claim 15, in which said generator comprises a generally spherical chamber having an exhaust nozzle discharging into said tubular chamber, a pulsed-air supply inlet to said generally spherical chamber, a pair of opposed electrodes across said inlet, and means exciting said electrodes in synchronism with the pulsations of air supply at said inlet.

References Cited in the file of this patent

UNITED STATES PATENTS

| | | |
|---|---|---|
| 2,052,796 | Rava | Sept. 1, 1936 |
| 2,519,531 | Worn | Aug. 22, 1950 |
| 2,700,305 | Kendall | Jan. 25, 1955 |
| 2,768,279 | Rava | Oct. 23, 1956 |
| 2,770,708 | Briggs | Nov. 13, 1956 |
| 2,826,708 | Foster | Mar. 11, 1958 |

FOREIGN PATENTS

| | | |
|---|---|---|
| 638,052 | Great Britain | May 31, 1950 |
| 720,466 | Great Britain | Dec. 22, 1954 |